(12) United States Patent
Kazmi et al.

(10) Patent No.: US 9,125,075 B2
(45) Date of Patent: *Sep. 1, 2015

(54) NETWORK-CONTROLLED E-UTRAN NEIGHBOR CELL MEASUREMENTS

(71) Applicant: Telefonaktiebolaget L M Ericsson (publ), Stockholm (SE)

(72) Inventors: Muhammad Ali Kazmi, Bromma (SE); Anders Furuskär, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/930,048

(22) Filed: Jun. 28, 2013

(65) Prior Publication Data

US 2013/0288663 A1  Oct. 31, 2013

Related U.S. Application Data

(63) Continuation of application No. 12/525,845, filed as application No. PCT/SE2008/050138 on Feb. 4, 2008, now Pat. No. 8,503,942.

(30) Foreign Application Priority Data

Feb. 5, 2007  (SE) ...................................... 0700286

(51) Int. Cl.
*H04B 17/00* (2015.01)
*H04W 24/02* (2009.01)
*H04W 36/30* (2009.01)
*H04W 36/00* (2009.01)
*H04W 48/16* (2009.01)

(52) U.S. Cl.
CPC .............. *H04W 24/02* (2013.01); *H04W 36/30* (2013.01); *H04W 36/0055* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 6,201,966 B1 | 3/2001 | Rinne et al. | |
| 2006/0058033 A1* | 3/2006 | Marsan et al. | 455/449 |
| 2007/0026810 A1* | 2/2007 | Love et al. | 455/67.11 |
| 2008/0220766 A1 | 9/2008 | Bertho et al. | |

(Continued)

FOREIGN PATENT DOCUMENTS

| | | |
|---|---|---|
| EP | 1677557 A1 | 7/2006 |
| JP | 1999088945 A | 3/1999 |

(Continued)

OTHER PUBLICATIONS

3rd Generation Partnership Project. "E-UTRA Measurements Related to Mobility." 3GPP TSG RAN WG1 Meeting #47bis, R1-070044, Sorrento, Italy, Jan. 15-19, 2007.

(Continued)

*Primary Examiner* — Zhiyu Lu
(74) *Attorney, Agent, or Firm* — Coats & Bennett, P.L.L.C.

(57) ABSTRACT

The present disclosure relates to methods and arrangements in a telecommunication system for network-controlled bandwidth for neighbor cell measurements. An appropriate network unit in the serving cell signals measurement bandwidth values to the UE which uses the signal values to perform one or more downlink measurements on the serving as well as the neighbor cells.

18 Claims, 2 Drawing Sheets

(56) References Cited

U.S. PATENT DOCUMENTS

2009/0010219 A1* 1/2009 Lee et al. ............... 370/329
2009/0042532 A1 2/2009 Bienas et al.
2009/0247149 A1* 10/2009 Lee et al. ............... 455/423

FOREIGN PATENT DOCUMENTS

| KR | 1020070080556 A | 8/2007 |
|----|-----------------|--------|
| WO | 0070897 A1 | 11/2000 |
| WO | 2006100405 A1 | 9/2006 |

OTHER PUBLICATIONS

3rd Generation Partnership Project. 3GPP TS 25.331, V7.3.0 (Dec. 2006). 3rd Generation Partnership Project; Technical Specification Group Radio Access Network; Radio Resource Control (RRC); Protocol Specification (Release 7), Dec. 2006.

Ericsson, "E-UTRA Intra-frequency Measurement Configuration and Control", 3GPP TSG-RAN WG2 Meeting #56, Nov. 6-10, 2006, Riga, Latvia, R2-063228.

Ericsson, "Measurement Bandwidth for Mobility related Measurements", 3GPP TSG-RAN WG1 #48bis, Mar. 26-30, 2007, Malta, R1-071597.

Ericsson, "Bandwidth of Mobility Related Measurements in E-UTRAN", 3GPP TSG-RAN WG4 (Radio) Meeting #42, Feb. 12-16, 2009, St. Louis, MO, US, R4-070192.

Ericsson, "Bandwidth of Mobility Related Measurements in E-UTRAN", 3GPP TSG-RAN WG4 (Radio) Meeting #42, Feb. 12-16, 2009, St. Louis, MO, US, R1-071041.

Ericsson, "Measurement Bandwidth for Mobility related Measurements", 3GPP TSG-RAN WG4 (Radio) Meeting #42bis, Apr. 2-4, 2007, Sophia Antipolis, France, R4-070405.

NEC, "UE Measurement Bandwidth for Intra Frequency Measurements", 3GPP TSG-RAN WG3#58, Nov. 5-9, 2007, Korea, Jeju, R3-072281.

NEC, "UE Measurement Bandwidth for Intra Frequency Measurements", 3GPP TSG-RAN WG2#60, Nov. 5-9, 2007, Korea, Jeju, R2-074973.

Huawei, "Some consideration for downlink channel quality measurements", 3GPP TSG-RAN Working Group 4 (Radio) meeting #40, Aug. 28-Sep. 1, 2006, Tallinn, Estonia, R4-060844.

Third Generation Partnership Project. "Reduction of neighbour cell list information sent to UE." 3GPP TSG-RAN WG2 #56; R2-063305; Nov. 6-10, 2006; pp. 1-5; Riga, Latvia.

* cited by examiner

NETWORK-CONTROLLED E-UTRAN NEIGHBOR CELL MEASUREMENTS

RELATED APPLICATIONS

This application is a continuation of U.S. application Ser. No. 12/525,845, filed 27 Aug. 2009, which was the National Stage of International Application No. PCT/SE2008/050138, filed 4 Feb. 2008, which claimed the benefit of SE 0700286-8, filed 5 Feb. 2007, the disclosures of each of which are incorporated by reference in their entirety.

TECHNICAL FIELD

The present disclosure relates to methods and arrangements in a telecommunication system, in particular to methods and arrangements for network-controlled bandwidth for neighbor cell measurements.

BACKGROUND

In E-UTRAN system several cell transmission bandwidths are possible, e.g., 1.4 MHz, 3 MHz, 5 MHz, 10 MHz, 15 MHz, 20 MHz, etc. Irrespective of the cell transmission bandwidth a user equipment (UE) is required to perform measurements on the neighbor cells. Hereby, it is important that the measurement reports from different cells are consistent and can be used by the network to execute reliable handovers, i.e., correct handover decisions.

Mobility support is one of the fundamental features of any cellular systems. In E-UTRAN the mobility has to be supported both in idle mode and in connected mode. In idle mode the UE in E-UTRAN shall do autonomous cell reselection based on some network signaled parameters. This allows the network to control UE mobility behavior in the coverage area to some extent.

Furthermore, the UE shall be able to do cell reselection within the same frequency layer (intra frequency cell reselection), between different frequency layers (inter-frequency cell reselection), and also between E-UTRAN and other systems such as UTRAN (inter-RAT cell reselection). In connected mode the network shall direct the UE to perform handover to a particular cell. Though this decision is taken by the network it is generally based on UE measurement reports. As in the case of cell reselection, the UE in connected mode shall also support mobility (i.e., handovers) within the same frequency layer, inter-frequency handovers and inter-RAT handovers. The cell reselection and handovers are generally based on one or more downlink measurements. These measurements are typically done on some known reference symbols or pilot sequences.

Another important aspect of the mobility is the identification of the UE position or geographical location. This allows the UE to get an access to location based services, e.g., map reading. There are several different types of positioning methods. In some of the methods the UE identifies its location based on one or more neighbor cell measurements that are also done on some known channel or pilot sequences.

A neighbor cell measurement is a measurement performed by a UE in serving cell(s) as well as neighbor cells on some known downlink reference symbols or pilot sequences. Unlike other measurements, such as CQI which is done on Transmission Time Interval (TTI) level (e.g., 1 ms), neighbor cell measurements are performed over longer time duration in the order of few 100 ms. The neighbor cell measurements can be broadly divided into two main categories:

Radio-related measurements
Timing-related measurements

The radio-related measurements are used to take handover decisions and allow UE to do cell reselection in idle mode. A good mobility procedure requires generally more than one measurement since one measurement alone cannot cover all the aspects and criteria. For instance both coverage and load in the cell should impact the cell change decision. In E-UTRAN the measurements are performed on the reference symbols that are sent with a certain pattern defined in time and frequency. This pattern is repeated every TTI (i.e., 1 ms). Some examples of neighbor cell measurements are:

Reference symbol received signal strength indicator (RS-RSSI); it is the same as reference symbol received power (RSRP) defined in E-UTRAN.
Carrier received signal strength indicator (Carrier RSSI)
RS-RSSI/Carrier RSSI; it is the same as reference symbol received quality (RSRQ) defined in E-UTRAN.

RS-RSSI (or RSRP) is measured over the downlink reference symbol, whereas carrier RSSI is measured over the entire UE reception bandwidth. Furthermore, RSRP is measured per cell whereas carrier RSSI is measured per carrier frequency.

Timing-related measurements are used for time alignment purposes during handover. An example would be the time difference between the reference signals from the serving and target cells. Similarly, other timing-related measurements could be used for positioning. An example is the time difference between the broadcast channel (BCH) from the serving and non-serving cells.

All the neighbor cell measurements are performed over a certain bandwidth. In earlier technologies, such as in WCDMA and GSM, these types of measurements are done over the entire cell bandwidth. One main reason is that in these systems a physical channel is sent over one signal bandwidth in all cells, e.g., 200 kHz in GSM and 5 MHz in WCDMA. On the other hand, in E-UTRAN different cell transmission bandwidths is possible. Therefore an efficient mechanism is needed to get consistent UE reports from different cells even if they operate with different bandwidths.

SUMMARY

It is an object of the present disclosure to improve measurement reports from a User Equipment in a cellular radio network.

It is another object of the present disclosure to provide a mechanism enabling consistent UE reports from different cells even if they operate with different bandwidths.

These objects and others are obtained by the method, user equipment and radio base station as set out in the appended claims.

Thus by signaling the measurement bandwidth over which the user equipment shall perform the neighbor cell measurements, a consistent reporting of measurement bandwidth can be obtained. The network may also instruct the user equipment how to report measurement results.

This disclosure also extends to a node, such as a radio base station, of a mobile telecommunications system configured to signal the bandwidth over which the user equipment shall perform the neighbor cell measurements. The node may also be configured to instruct the user equipment how to report the measurement results.

This disclosure further extends to a user equipment configured to receive measurement configuration information from a radio base station. Using the configuration information the user equipment is adapted to acquire measurement bandwidth information from the serving cell over which the measurement is to be performed, performing measurements of the neighbor cells over the acquired measurement bandwidth, and report measurements to the network.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

The present disclosure will now be described by way of non-limiting examples and with reference to the accompanying drawings, in which.

DETAILED DESCRIPTION

There are currently two main proposals on bandwidth for neighbor cell measurements for E-UTRAN system, which however both imply certain problems:

A first proposal relates to a fixed, such as 1.4 MHz, bandwidth. The idea is to limit the measurement bandwidth to the center sub-carriers (e.g., 72 for 1.4 MHz) irrespective of the cell transmission bandwidth. This means even for a cell employing 20 MHz, the measurement bandwidth would be limited to 1.4 MHz if that is used. Though this simplifies UE implementation, it, however, implies the problem that the measurement does not reflect the radio situation over the wider bandwidth. This means that a cell with larger bandwidth cannot benefit from having more reliable neighbor cell measurements in terms of radio properties.

A second proposal relates to a measurement bandwidth that equals the cell bandwidth. Here, the idea is to use the state of the art method of performing the neighbor cell measurements over the entire cell transmission bandwidth. This is attractive in the sense that the measurement reflects the radio performance over the entire cell bandwidth. However, there are two main problems with this solution: First, the UE needs to read the system information (i.e., BCH) of every neighbor cell to acquire the bandwidth of that cell. The BCH reading may lead to additional delay, processing (power consumption) and implementation complexity in the UE. Second, in a heterogeneous cells scenario, where cells have different bandwidths in a coverage area, this solution would lead to inconsistent measurement reports from cells with different bandwidths. This second point can be illustrated by help of three possible deployment scenarios with respect to cell transmission bandwidth:

A. Homogeneous bandwidth deployment: In practice the most likely case is that in one geographical location (comprising of several sites) or in one coverage area, all cells have the same bandwidth.

B. Heterogeneous bandwidth deployment: This scenario is likely to be less frequent but there might still be cases where heterogeneous cells in terms of different bandwidths are present in a geographical area.

C. Border areas between different deployments: Irrespective of the fact whether all cells have the same bandwidths (homogeneous cells) or different bandwidths (heterogeneous cells) in a geographical area, there will be border areas where cells of different bandwidths coincide.

The major impact of scenarios B and C above is that measurement reports from different cells will be based on different bandwidths, which could lead to inappropriate handover or cell reselection decisions.

This and other issues related to the problems described above are solved according to the present disclosure.

Figure 1:
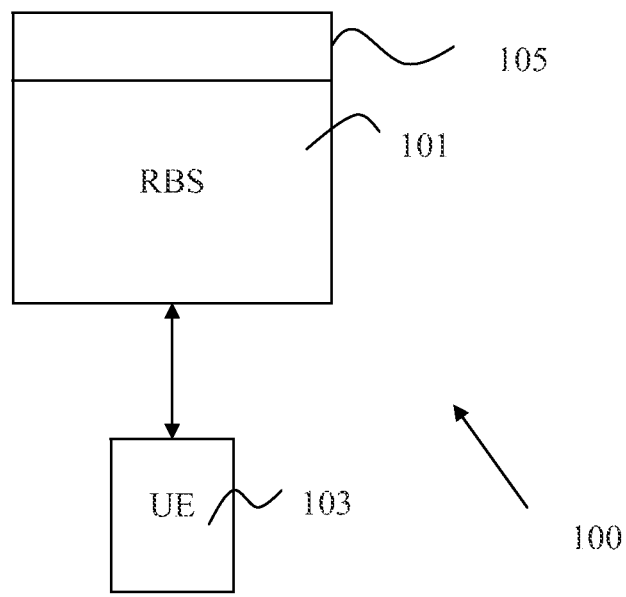
FIG. 1 is a general view of a cellular radio system.

With reference to FIG. 1 an exemplary embodiment is shown. In FIG. 1 a mobile telecommunication system 100 is shown. The system 100 comprises a number of radio base stations 101, whereof only one is shown for reasons of simplicity. The system 100 is configured to signal measurement bandwidth values to a User Equipment 103 connected to the network 100. The signaling to the UE can be performed via an appropriate network unit 105 in the serving cell, which can be located in the Radio Base Station 101.

The UE 103 uses the signal values to perform one or more downlink measurements on the serving as well as the neighbor cells. In a scenario with heterogeneous cells comprising of cells with different bandwidths the signaled measurement bandwidth could be the minimum of the bandwidths in all cells.

The present disclosure allows for at least the following advantages:

In heterogeneous cell bandwidth deployment scenario the measurement reports from all the cells will be consistent in terms of radio properties.

It provides flexibility to the network to be able to set the measurement bandwidth according to the bandwidth of the available cells.

The UE does not have to read system information of the neighbor cells to acquire their bandwidths for doing neighbor cell measurements. This reduces both complexity in UE and also reduces measurement reporting delay.

Same mechanism is available for all types of measurements: radio related and timing measurements for handovers and positioning etc.

In accordance with the present disclosure the bandwidth of the neighbor cell measurements is controlled by the network and, therefore, varies in accordance with the bandwidth deployment scenario. The network is aware of the deployment scenario, i.e., cell bandwidth(s) used in the coverage area or in a particular geographical location. Preferably network sets one single bandwidth over which the UE shall measure all the neighbor cells.

Figure 2:
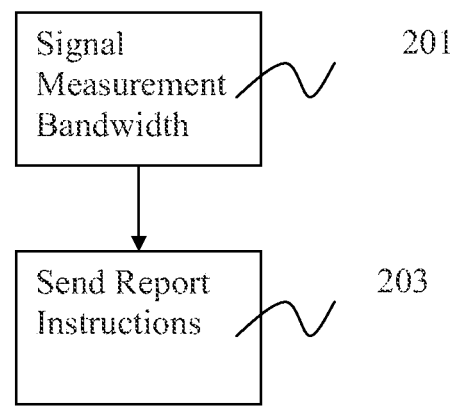
FIG. 2 is a flow chart illustrating steps performed when transmitting configuration instructions to a User equipment.

In FIG. 2 a flow chart illustrating some steps performed in a radio base station when executing command of the measurements performed by the user equipment are shown. First in a step 201 the radio base station signals the measurement bandwidth over which the user equipment shall perform the neighbor cell measurements. Next, in a step 203, the radio base station transmits a message instructing the user equipment how to report the measurement results.

Figure 3:
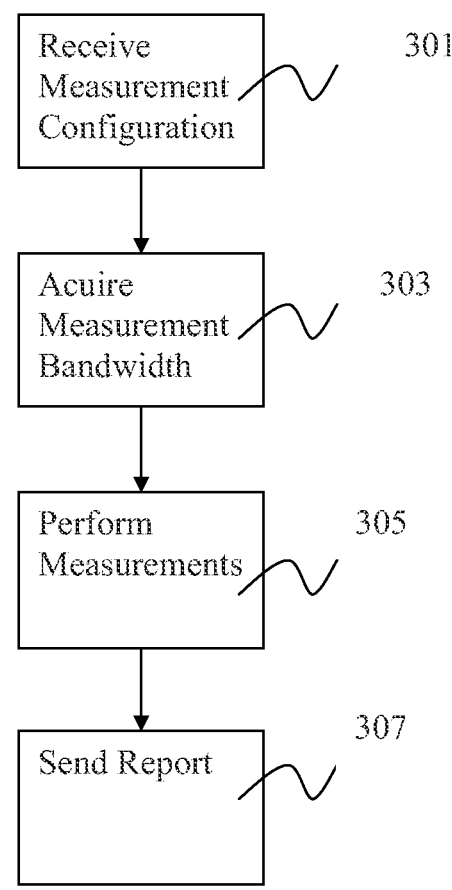
FIG. 3 is a flow chart illustrating steps performed when performing measurements in a user equipment.

In FIG. 3, a flow chart illustrating steps performed in a user equipment when receiving measurement commands from a radio base station are shown. First in a step 301 the UE receives measurement configuration information from a radio base station. Next, in a step 303 the UE acquires measurement bandwidth information from the serving cell over which a measurement is to be performed. Then, in a step 305, the UE performs measurements of neighbor cells over the acquired measurement bandwidth. Thereupon, in a step 307 the UE reports the measurements to the network.

Regarding possible measurement bandwidths, in principle any bandwidth is possible that is an integer multiple of the available sub-carriers. However, with regard to complexity, it can be sufficient to limit the measurement bandwidths to all possible available bandwidths, i.e., 1.4 MHz, 3 MHz, 5 MHz, 10 MHz, 15 MHz, 20 MHz, and so on. As an example, the network can signal the measurement bandwidth as the minimum of all cells' bandwidths deployed in a coverage area.

Alternatively the network can signal any suitable measurement bandwidth parameter that would ensure that UE measurements done according to this parameters are consistent from different cells.

Hence, by virtue of the network-controlled bandwidth the UE shall perform the neighbor cell measurement over the same number of sub-carriers irrespective of the cell bandwidths. This means in scenarios B and C described above, the UE is able to report measurements that would be consistent since same measurement bandwidth is set by the network for all the cells.

It is one of the advantages of the present disclosure that the UE does not have to read the system information of the neighbor cells to acquire the cell bandwidth prior to do neighbor cell measurement. Indeed, the measurement bandwidth can be signaled by the serving cell to the UE. In idle mode the UE can be informed about the measurement bandwidth via the system information i.e., BCH sent from the serving cell. It should be noted that in idle mode a UE reads system information of its serving cell after every cell reselection. In connected mode the serving cell can signal the measurement bandwidth via a shared channel to the UE. This will, on the one hand reduce UE complexity in terms of acquiring bandwidth of each cell and, on the other hand, provide more flexibility to the network in terms of making use of larger measurement bandwidth whenever possible according to the deployment scenario.

Regarding measurement procedures with network-controlled bandwidth, it is important to consider how the network-controlled bandwidth will affect the cell identification procedure as discussed in the following: The first step in the measurement procedure is the cell identification, which is followed by the actual measurement and eventually reporting the measurement results to the network. According to one conceivable cell identification procedure the UE will first acquire a cell group identity (ID), which is mapped on the synchronization channel (SCH). The SCH occupies only the central 72 sub-carriers (i.e., SCH bandwidth is limited to 1.4 MHz). After acquiring the cell group ID the UE shall identify the cell ID, which is mapped on the reference symbols. It is possible for the UE to find the cell ID by demodulating only the reference symbols in the central 1.25 MHz for all bandwidths. This means the network-controlled bandwidth does not require the UE to know the actual bandwidth of the cell for the purpose of identifying a cell (i.e., cell ID acquisition), which implies that the UE can perform measurement on all the cells (serving and neighbors) over the network signaled bandwidth without reading system information of the neighbor cells.

Thus, the foregoing description and the accompanying drawings represent non-limiting examples of the methods and apparatus taught herein. As such, the present disclosure is not limited by the foregoing description and accompanying drawings. Instead, the present disclosure is limited only by the following claims and their legal equivalents.

What is claimed is:

1. A method in a radio base station of a telecommunication network for configuring a user equipment to perform one or more downlink measurements on a plurality of neighbor cells within a coverage area, the method comprising:
    signaling measurement configuration information to the user equipment that comprises:
        an indication of a variably sized single measurement bandwidth over which the user equipment is to perform neighbor cell downlink measurements for the plurality of neighbor cells when at least some of the neighbor cells have different bandwidths; and
        an indication of an additional variably sized single measurement bandwidth that is to be used to perform neighbor cell downlink measurements for a different plurality of neighbor cells in the coverage area;
    wherein the neighbor cell downlink measurements are not CQI measurements.

2. The method of claim 1, further comprising:
    instructing the user equipment on how to report the measurement results.

3. The method of claim 2, wherein the reporting is instructed to be periodic.

4. The method of claim 2, wherein the reporting is instructed to be event-triggered.

5. The method of claim 1, wherein each neighbor cell in the coverage area has a bandwidth, and wherein the variably sized single measurement bandwidth is a minimum of the neighbor cell bandwidths.

6. The method of claim 1, wherein the variably sized single measurement bandwidth is signaled via system information of a serving cell for users in idle mode or in connected mode.

7. The method of claim 1, wherein the variably sized single measurement bandwidth is signaled via a shared channel or via a dedicated channel to users in connected mode.

8. The method of claim 1, wherein the variably sized single measurement bandwidth is a bandwidth used by neighbor cells operating on a same carrier frequency as the serving cell.

9. The method of claim 1, wherein the variably sized single measurement bandwidth is a bandwidth used by neighbor cells operating on a carrier frequency that is different than a carrier frequency used by the serving cell.

10. A radio base station of a mobile telecommunication network for configuring a user equipment to perform one or more downlink measurements on a plurality of neighbor cells within a coverage area, wherein the radio base station comprises circuitry configured to:
    signal to the user equipment measurement configuration information comprising:
        an indication of a variably sized single measurement bandwidth over which the user equipment is to perform neighbor cell downlink measurements for the plurality of neighbor cells when at least some of the neighbor cells have different bandwidths; and
        an indication of an additional variably sized single measurement bandwidth that is to be used to perform neighbor cell downlink measurements for a different plurality of neighbor cells in the coverage area;
    wherein the neighbor cell downlink measurements are not CQI measurements.

11. The radio base station of claim 10, wherein the circuitry of the radio base station is further configured to instruct the user equipment on how to report the measurement results.

12. The radio base station of claim 11, wherein the reporting is instructed to be periodic.

13. The radio base station of claim 11, wherein the reporting is instructed to be event-triggered.

14. The radio base station of claim 10, wherein each neighbor cell in the coverage area has a bandwidth, and wherein the variably sized single measurement bandwidth is a minimum of the neighbor cell bandwidths.

15. The radio base station of claim 10, wherein the variably sized single measurement bandwidth is a function of the different bandwidths of the neighbor cells.

16. The radio base station of claim 10, wherein the neighbor cell downlink measurements are based on one or more of a reference symbol received signal strength indicator (RS-RSSI) and a carrier received signal strength indicator (Carrier RSSI).

17. The method of claim 1, wherein the variably sized single measurement bandwidth is a function of the different bandwidths of the neighbor cells.

18. The method of claim 1, wherein the neighbor cell downlink measurements are based on one or more of a reference symbol received signal strength indicator (RS-RSSI) and a carrier received signal strength indicator (Carrier RSSI).

* * * * *